US012736245B2

(12) United States Patent
Tillack

(10) Patent No.: US 12,736,245 B2
(45) Date of Patent: Sep. 15, 2026

(54) CHILLER CONTROLLER FOR OPTIMIZED EFFICIENCY

(71) Applicant: TEKWORX, LLC, Cincinnati, OH (US)

(72) Inventor: Lawerence E. Tillack, Milford, OH (US)

(73) Assignee: TEKWORX, LLC, Cincinnati, OH (US)

( * ) Notice: Subject to any disclaimer, the term of this patent is extended or adjusted under 35 U.S.C. 154(b) by 828 days.

(21) Appl. No.: 17/747,378

(22) Filed: May 18, 2022

(65) Prior Publication Data

US 2022/0373210 A1 Nov. 24, 2022

Related U.S. Application Data

(63) Continuation-in-part of application No. 17/324,613, filed on May 19, 2021, now abandoned.

(51) Int. Cl.
*F24F 11/63* (2018.01)
*G05B 19/042* (2006.01)

(52) U.S. Cl.
CPC ............ *F24F 11/63* (2018.01); *G05B 19/042* (2013.01); *G05B 2219/2614* (2013.01)

(58) Field of Classification Search
None
See application file for complete search history.

(56) References Cited

U.S. PATENT DOCUMENTS

| | | | | |
|---|---|---|---|---|
| 4,463,574 A * | 8/1984 | Spethmann | F24F 11/46 | 700/36 |
| 4,483,152 A * | 11/1984 | Bitondo | F25D 17/02 | 702/182 |
| 2020/0049394 A1* | 2/2020 | Szewerenko | F25B 49/02 | |
| 2022/0196309 A1* | 6/2022 | Kirkman | F24F 11/46 | |

OTHER PUBLICATIONS

Farooq, Omair. "Understanding Chiller Efficiency", Sep. 4, 2018, <https://www.linkedin.com/pulse/understanding-chiller-efficiency-omair-farooq> (Year: 2018).*

(Continued)

*Primary Examiner* — Kenneth M Lo
*Assistant Examiner* — Istiaque Ahmed
(74) *Attorney, Agent, or Firm* — Wood Herron & Evans LLP

(57) ABSTRACT

Systems, methods, and computer program products for staging chillers in a chiller group. Operational data is collected on chillers in a chiller group, and performance curves indicative of chiller efficiency generated for each chiller based on the operational data. During operation, a current thermal load and a current group efficiency is determined for the chiller group. Estimated group efficiencies are also determined for the chiller group for one or more scenarios in which one or more offline chillers are brought online, online chillers are taken offline, or both online chillers are taken offline and offline chillers are brought online. If the estimated efficiency of the chiller group is higher than the current efficiency for any of the scenarios, chillers in the chiller group are brought online or taken offline so that the chiller group operates in accordance with the most efficient scenario.

16 Claims, 10 Drawing Sheets

(56) References Cited

OTHER PUBLICATIONS

Rahman, Saidur & Hasanuzzaman, Ts. Dr. Md & Mahlia, T M Indra & Abd Rahim, Nasrudin & Mohammed, Hussein. (2011). Chillers energy consumption, energy savings and emission analysis in an institutional buildings. Energy. 36. 5233-5238. 10.1016/j.energy.2011.06.027. (Year: 2011).*

Durkin TH, James B (Burt) Rishel. Dedicated heat recovery. Ashrae J. 2003 10;45(10):18,22,24, <https://www.proquest.com/scholarly-journals/dedicated-heat-recovery/docview/220449492/se-2?accountid=14753> (Year: 2003).*

* cited by examiner

CHILLER CONTROLLER FOR OPTIMIZED EFFICIENCY

CROSS-REFERENCE TO RELATED APPLICATIONS

The present application claims the benefit of co-pending U.S. application Ser. No. 17/324,613, filed May 19, 2021, the disclosure of which is incorporated by reference herein in its entirety.

FIELD OF THE INVENTION

The present invention relates generally to Heating, Ventilation, and Air Conditioning (HVAC) systems and, more particularly, to systems, methods, and software products for controlling operation of chillers in an HVAC system for optimal efficiency.

BACKGROUND

Commercial buildings include a variety of building types, such as offices, hospitals, factories, schools, warehouses, storage, lodging, entertainment venues, shopping malls, and other large structures. The U.S. Energy Information Administration (EIA) estimates that in 2019, the commercial sector accounted for over 36% of all electrical consumption in the United States. A large and growing amount of this electricity is used to power air conditioning systems. Moreover, the EIA projects that delivered energy for air conditioning will increase more than any other end use in residential and commercial buildings through 2050. Thus, air conditioning systems are expected to account for a large portion of the total electrical energy consumption in the United States and the rest of the developed world for the foreseeable future.

Large HVAC systems typically rely on machines known as “chillers” to remove heat using a vapor-compression refrigeration cycle. A chiller of this type includes a compressor, a condenser, a thermal expansion valve, an evaporator, and a refrigerant that circulates through the system. The refrigerant is first compressed by the compressor, which causes the temperature of the refrigerant to increase. The hot compressed refrigerant is then passed through the condenser, where heat is released, allowing the refrigerant to condense into a liquid. The liquid refrigerant then passes through the expansion valve, where it experiences a reduction in pressure. This reduction in pressure leads to evaporation of the refrigerant, which lowers the temperature of the refrigerant. The cool expanded refrigerant then passes through the evaporator, where it absorbs heat before returning to the compressor to repeat the cycle.

Chillers require power to operate the compressor, as well as any fans or pumps associated with circulating air, coolant, or the working fluid, and are typically sized based on the cooling capacity required. However, HVAC systems for large commercial spaces typically use a number of chillers in order to provide enough cooling capacity to maintain interior temperatures during peak load conditions. The HVAC system cools the interior of the building by circulating a working fluid, such as water or a water-glycol mix, between the chillers and air handlers inside the building. Each air handler blows air through a heat exchanger that exchanges heat between the working fluid and the air in the building. The chillers are cycled on and off as needed to maintain the building temperature, with more chillers being in operation under high cooling load conditions (e.g., during summer afternoons) than under low or moderate cooling load conditions (e.g., during springtime or nighttime operation).

Conventional HVAC system controllers activate and deactivate chillers based primarily on cooling load requirements. However, this simplistic method of controlling chillers can lead to inefficient chiller operation in multi-chiller systems. Thus, there is a need for improved systems, methods, and computer program products for chiller control in HVAC systems using multiple chillers.

SUMMARY

In an embodiment of the invention, a method of staging a chiller group including a plurality of chillers is provided. The method includes determining a thermal load on the chiller group, determining a current efficiency of the chiller group, and determining an estimated efficiency of the chiller group after executing a staging operation including one of bringing an offline chiller online, taking an online chiller offline, or both bringing the offline chiller online and taking the online chiller offline. If the estimated efficiency of the chiller group is higher than the current efficiency of the chiller group, the method further includes staging the chiller group according to the staging operation.

In an aspect of the invention, the method may further include generating a performance curve for each chiller, each performance curve defining a relationship between a thermal transfer rate of the chiller and a parameter related to a power consumption of the chiller.

In another aspect of the invention, generating the performance curve may include determining a value of the parameter of the chiller at each of a plurality of thermal transfer rates, determining a ratio of the value of the parameter and the thermal transfer rate of the chiller at each thermal transfer rate based the value of the parameter at the thermal transfer rate, and defining the performance curve base on the ratio at each of a plurality of thermal transfer rates.

In another aspect of the invention, the parameter may include at least one of an amount of power being consumed by the chiller, a cost of the power being consumed by the chiller, or an amount of a pollutant emitted generating the power being consumed by the chiller.

In another aspect of the invention, the performance curve may be generated for each of a plurality of operating conditions.

In another aspect of the invention in which the staging operation includes bringing the offline chiller online, determining the estimated efficiency of the chiller group for the staging operation may include distributing the thermal load between the offline chiller being brought online and one or more online chillers, estimating an efficiency of each chiller carrying at least a portion of the thermal load based on the performance curve of the respective chiller, and determining a weighted average of the estimated efficiency of each chiller to generate the estimated efficiency of the chiller group.

In another aspect of the invention in which the staging operation includes taking the online chiller offline, determining the estimated efficiency of the chiller group for the staging operation may include distributing the thermal load carried by the chiller being taken offline between one or more remaining online chillers, estimating an efficiency of each of the one or more remaining online chillers based on the performance curve of the respective chiller, and determining a weighted average of the estimated efficiencies of each of the one or more remaining online chillers to generate the estimated efficiency of the chiller group.

In another aspect of the invention in which the staging operation includes both bringing the offline chiller online and taking the online chiller offline, determining the estimated efficiency of the chiller group for the staging operation may include distributing the thermal load from the chiller being taken offline to the chiller being brought online, estimating an efficiency of each remaining online chiller and the chiller being brought online based on the performance curve of the respective chiller, and determining a weighted average of the estimated efficiencies of the chillers to generate the estimated efficiency of the chiller group.

In another aspect of the invention, the method may further include monitoring one or more operating conditions of each chiller, and storing the one or more operating conditions in a database. The performance curves may then be generated based on the one or more operating conditions.

In another aspect of the invention, at least one chiller of the plurality of chillers may be a heat recovery chiller, the thermal load may include a cooling load and a heating load, the current efficiency and the estimated efficiency of the chiller group may each be determined based on a parameter related to power consumption, and the method may further include determining a reduction in a value of the parameter resulting from the heat recovery chiller providing heat to the heating load, and adjusting one or both of the current efficiency of the chiller group and the estimated efficiency of the chiller group by taking into account the reduction in the value of the parameter resulting from the heat recovery chiller providing heat to the heating load.

In another embodiment of the invention, a system is provided. The system includes the chiller group including the plurality of chillers, one or more processors operatively coupled to the plurality of chillers, and a memory coupled to the one or more processors and including program code. When executed by the one or more processors, the program code causes the system to determine the thermal load on the chiller group, determine the current efficiency of the chiller group, and determine the estimated efficiency of the chiller group after executing the staging operation including one of bringing the offline chiller online, taking the online chiller offline, or both bringing the offline chiller online and taking the online chiller offline. If the estimated efficiency of the chiller group is higher than the current efficiency of the chiller group, the program code further causes the system to stage the chiller group according to the staging operation.

In another aspect of the system, the program code may further cause the system to generate the performance curve for each chiller, each performance curve defining the relationship between the thermal transfer rate of the chiller and the parameter related to the power consumption of the chiller.

In another aspect of the system, the program code may further cause the system to generate the performance curve by determining the value of the parameter of the chiller at each of the plurality of thermal transfer rates, determining the ratio of the value of the parameter and the thermal transfer rate of the chiller at each thermal transfer rate based the value of the parameter at the thermal transfer rate, and defining the performance curve base on the ratio at each of the plurality of thermal transfer rates.

In another aspect of the system, the parameter may include at least one of the amount of power being consumed by the chiller, the cost of the power being consumed by the chiller, or the amount of the pollutant emitted generating the power being consumed by the chiller.

In another aspect of the system in which the staging operation includes bringing the offline chiller online, the program code may cause the system to determine the estimated efficiency of the chiller group for the staging operation by distributing the thermal load between the offline chiller being brought online and the one or more online chillers, estimating the efficiency of each chiller carrying at least the portion of the thermal load based on the performance curve of the respective chiller, and determining the weighted average of the estimated efficiency of each chiller to generate the estimated efficiency of the chiller group.

In another aspect of the system in which the staging operation includes taking the online chiller offline, the program code may cause the system to determine the estimated efficiency of the chiller group for the staging operation by distributing the thermal load carried by the chiller being taken offline between the one or more remaining online chillers, estimating the efficiency of each of the one or more remaining online chillers based on the performance curve of the respective chiller, and determining the weighted average of the estimated efficiencies of each of the one or more remaining online chillers to generate the estimated efficiency of the chiller group.

In another aspect of the system in which the staging operation includes both bringing the offline chiller online and taking the online chiller offline, the program code may cause the system to determine the estimated efficiency of the chiller group for the staging operation by distributing the thermal load from the chiller being taken offline to the chiller being brought online, estimating the efficiency of each remaining online chiller and the chiller being brought online based on the performance curve of the respective chiller, and determining the weighted average of the estimated efficiencies of the chillers to generate the estimated efficiency of the chiller group.

In another aspect of the system, the program code may further cause the system to monitor the one or more operating conditions of each chiller, and store the one or more operating conditions in a database. The performance curves may then be generated based on the one or more operating conditions.

In another aspect of the system, at least one chiller of the plurality of chillers may be the heat recovery chiller, the thermal load may include the cooling load and the heating load, the current efficiency and the estimated efficiency of the chiller group may each be determined based on the parameter related to power consumption, and the program code may further cause the system to determine the reduction in a value of the parameter resulting from the heat recovery chiller providing heat to the heating load, and adjust one or both of the current efficiency of the chiller group and the estimated efficiency of the chiller group by taking into account the reduction in the value of the parameter resulting from the heat recovery chiller providing heat to the heating load.

In another embodiment of the invention, a computer program product is provided. The computer program product includes a non-transitory computer-readable storage medium, and program code stored on the non-transitory computer-readable storage medium. The program code is configured so that, when it is executed by one or more processors, it causes the one or more processors to determine the thermal load on the chiller group, and determine the current efficiency of the chiller group. The program code further causes the one or more processors to determine the estimated efficiency of the chiller group after executing the staging operation including one of bringing the offline chiller online, taking the online chiller offline, or both bringing the offline chiller online and taking the online chiller offline. If the estimated efficiency of the chiller group is higher than the current efficiency of the chiller group, the program code further causes the one or more processors to stage the chiller group according to the staging operation.

The above summary presents a simplified overview of some embodiments of the invention to provide a basic understanding of certain aspects of the invention discussed herein. The summary is not intended to provide an extensive overview of the invention, nor is it intended to identify any key or critical elements, or delineate the scope of the invention. The sole purpose of the summary is merely to present some concepts in a simplified form as an introduction to the detailed description presented below.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

It should be understood that the appended drawings are not necessarily to scale, and may present a somewhat simplified representation of various features illustrative of the basic principles of the invention. The specific design features of the sequence of operations disclosed herein, including, for example, specific dimensions, orientations, locations, and shapes of various illustrated components, may be determined in part by the particular intended application and use environment. Certain features of the illustrated embodiments may have been enlarged or distorted relative to others to facilitate visualization and a clear understanding. In particular, thin features may be thickened, for example, for clarity or illustration.

DETAILED DESCRIPTION

Embodiments of the invention control staging of a group of chillers to improve efficiency of the HVAC system by optimizing both the number of chillers online, and the order in which chillers are brought online and taken offline. Over time, plant operating conditions such as the ambient air conditions and the thermal load (e.g., cooling load) of the building can change, affecting the efficiency characteristics of a chiller. These parameters may be monitored in real time and used to collect data for individual chillers. Polynomial regression or linear interpolation may then be performed on the collected data to produce one or more "performance curves" for each chiller across a range of operating conditions, e.g., the condenser or evaporator coolant/air/working fluid temperature. Each performance curve may define a relationship between the thermal transfer rate of the chiller (e.g., the refrigeration rate) and a parameter which is to be optimized, such as the power being consumed by the chiller under a set of plant operating conditions. Under a current set of plant operating conditions, the HVAC system may compare performance curves to prioritize bringing the most efficient chillers online, to determine the number of chillers needed to meet the thermal load of the building while operating each chiller at its most efficient operational point, and the distribution of the thermal load between the online chillers. The results of this analysis may be used to generate a series of chiller calls to a Building Automation System (BAS). The BAS may in turn transmit commands to one or more chiller plant controllers to run a group of chillers according to the chiller calls.

Figure 1:
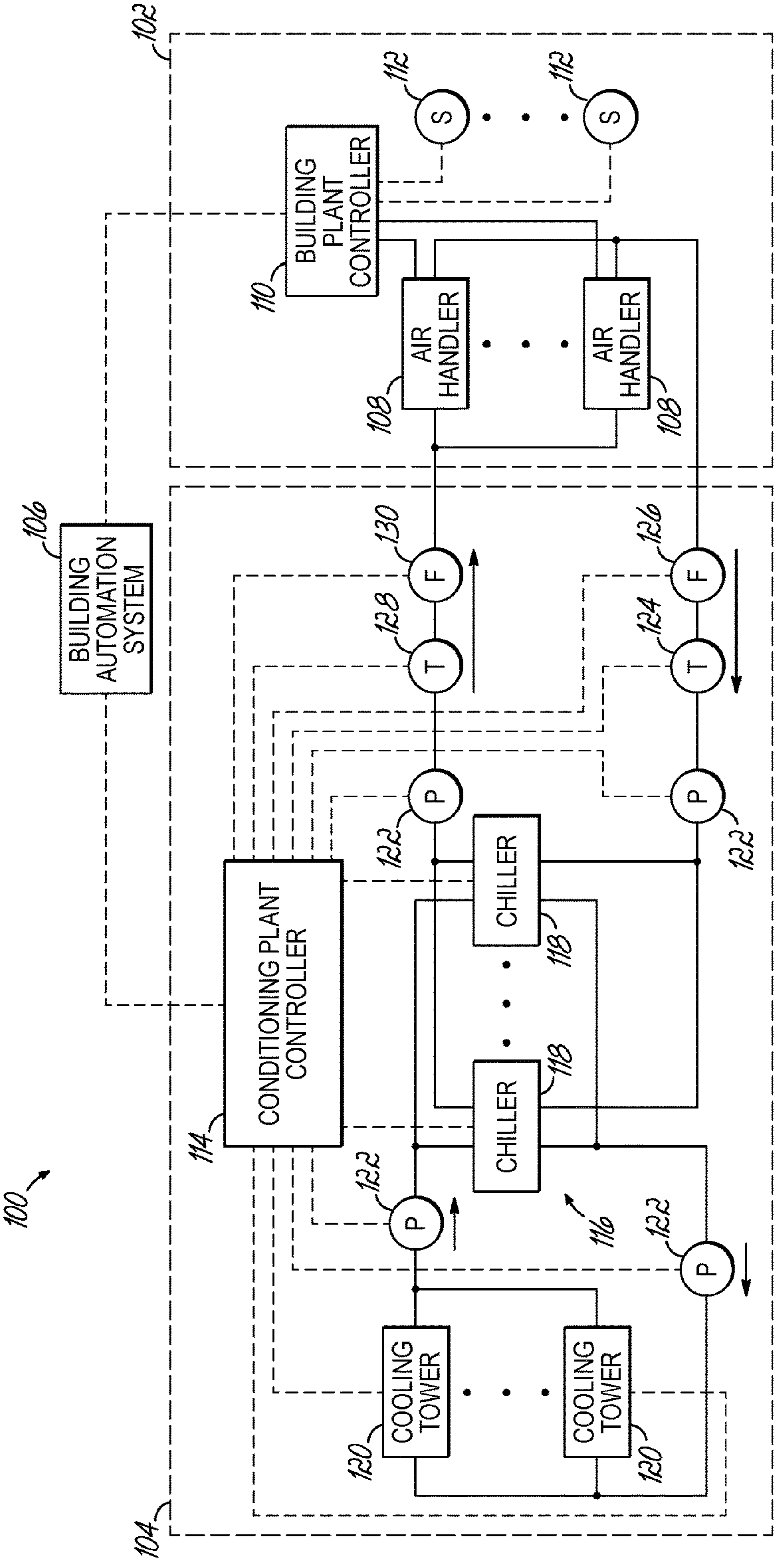
FIG. 1 is a diagrammatic view of an exemplary HVAC system including a plurality of chillers.

Referring now to FIG. 1, an exemplary HVAC system 100 in accordance with an embodiment of the invention may include a building plant 102 and a conditioning plant 104 in communication with a BAS 106. The BAS 106 may be a computer-based system that controls and monitors mechanical and electrical equipment in one or more buildings, such as buildings on a campus. In addition to the HVAC system 100, equipment under control of, or monitored by, the BAS 106 may include lighting, power systems, fire systems, security systems, or any other suitable system.

The building plant 102 may include one or more air handlers 108 that condition air in one or more zones of a building, a building plant controller 110, and various sensors 112, e.g., temperature, humidity, and pressure sensors. Each air handler 108 may be responsible for controlling air temperature in a zone of the building, such as a floor, by supplying conditioned air to the zone through air supply ducts. Each air handler 108 may receive return air from the zone it conditions through air return ducts. This return air may be selectively mixed with outside air and passed through a heat exchanger that heats or cools the air through thermal conduction to a heated or chilled working fluid, such as water or a water-glycol mix.

The building plant controller 110 may receive signals from the sensors 112. Each signal received from the sensors 112 may be indicative of a characteristic of the air in a zone conditioned by an air handler 108 or air flowing through a portion of an air handler 108, such as air flowing through return duct. In response to these signals, the building plant controller 110 may adjust dampers, fan speeds, working fluid flow rate, or other control elements of the one or more air handlers 108 to control the amount and temperature of conditioned air provided to each zone. The building plant controller 110 may thereby maintain the air in each zone within a predetermined range about a setpoint temperature. Although FIG. 1 depicts single building plant controller 110, it should be understood that the building plant controller 110 may employ a hierarchical control system that includes controllers in one or more of the air handlers 108 as well as one or more system-wide supervisory controllers. Thus, each air handler 108 may be under the control of its own controller, or may share a controller with one or more other air handlers 108.

The conditioning plant 104 may include a conditioning plant controller 114 in communication with a chiller group 116 having a plurality of chillers 118, one or more cooling towers 120, one or more pumps 122, and various sensors. These sensors may include, for example, an incoming working fluid temperature sensor 124 and flow rate sensor 126, an outgoing working fluid temperature sensor 128 and flow rate sensor 130, as well as pressure, humidity, electrical power draw, and additional flow rate and temperature sensors (not shown).

Each chiller 118 may be operatively coupled to the cooling towers 120 and the air handlers 108 of building plant 102, e.g., by coolant (e.g., water or water-glycol mix) flowing through piping. At least one of the pumps 122 may be configured to selectively circulate the working fluid between the chillers 118 and the building plant 102 in response to control signals from the conditioning plant controller 114. At least another of the pumps 122 may be configured to selectively circulate coolant between the chillers 118 and the cooling towers 120.

To provide chilled working fluid to the building plant 102, the chillers 118 may transfer heat from the working fluid to the coolant. The cooling towers 120 may then transfer heat from the coolant to the outdoor environment. One or more of the chillers 118 may also be air-cooled, in which case ambient air may be circulated over the chiller's condenser (e.g., by a fan) rather than coolant from the cooling towers 120. In any case, it should be understood that the working fluid and the coolant are not limited to any particular medium, and that any suitable medium may be used to transfer thermal energy between the chillers 118, the outdoor environment, and the building plant 102.

Although each chiller 118 is depicted as exchanging heat with the environment through one or more cooling towers 120, embodiments of the invention are not limited to this configuration. For example, in an alternative embodiment of the invention, one or more (or all) of the chillers 118 may be heat recovery chillers. Like standard chillers 118, heat recovery chillers 118 use the refrigeration cycle to provide chilled water to cooling loads within the HVAC system 100. However, the heat absorbed within the cooling process and transferred to the condenser of a heat recovery chiller 118 is reclaimed rather than discarded. To reclaim heat, instead of transferring the heat to the environment through a cooling tower 120, the heat recovery chiller transfers heat to a heating load. Heating loads may include, but are not limited to, heating air for an HVAC system or industrial dryer, hot water systems (e.g., that provide hot water to a laundry, bathroom, or kitchen), heating a pool or sauna, or any other system or process that requires heat. Any facility with simultaneous heating and cooling loads may benefit from the use of heat recovery chillers. Chillers 118 may be designed as dedicated heat recovery chillers, include separate heat recovery condensers (e.g., a standard condenser thermally coupled to the cooling towers 120 and a heat recovery condenser thermally coupled to the heating load), or have one condenser that is selectively thermally couplable to either the cooling towers 120 or a heating load. Heat recovery chillers can help offset and possibly eliminate the use of boilers within a hot water system, and may help reach goals for electrification and reduction of carbon emissions from burning fossil fuels, such as natural gas or heating oil.

The conditioning plant controller 114 may operate the chillers 118 at a thermal transfer rate that provides a continuous flow of working fluid at a desired setpoint temperature, e.g., 42 degrees F. (5.6 degrees C.). To this end, the controller 114 may receive temperature data from the outgoing working fluid temperature sensor 128 and compare this data to the setpoint temperature, e.g., using a Proportional-Integral-Derivative (PID) control algorithm. If the temperature of the working fluid is too far above or below the setpoint temperature, the controller 114 may adjust the thermal transfer rate of the chiller group 116. This may be accomplished by adjusting the thermal transfer rate of one or more chillers 118 which are currently online (e.g., by changing the position of vein-guides to meet the required cooling capacity), by executing a staging operation that brings currently offline chillers 118 online, or that takes currently online chillers 118 offline.

As with the building plant controller 110, although the conditioning plant controller 114 is shown as a single controller, it should be understood that each chiller 118, cooling tower 120, or other conditioning plant components may be under the control of its own controller, or may share a controller with one or more other plant components. Thus, conditioning plant controller 114 may employ a hierarchical control system that includes controllers in one or more of the plant components as well as one or more system-wide supervisory controllers.

In addition, although the conditioning plant 104 is generally described herein with respect to cooling operations, it should be understood that the chillers 118 could comprise heat pumps capable of transferring heat to or from the working fluid. This would allow the HVAC system 100 to operate in a heating mode in which heated working fluid is provided to the building plant, e.g., to provide heat to the building plant 102 on cold days. The HVAC system 100 may also warm the working fluid using a boiler (not shown) or through a combination of operating the chillers 118 to transfer heat from the coolant or outside air into the working fluid and warming the fluid using the boiler. The term thermal load may therefore refer to either a heating load or a cooling load that is being satisfied by the HVAC system 100, the chiller group 116, or an individual chiller 118.

When working in a cooling mode, the purpose of a group of chillers is to maintain comfort levels in the air-conditioned zones served by the HVAC system 100 by providing cooling capacity. In conventional systems, the chillers 118 are staged to switch on and off as necessary to maintain the working fluid at a predetermined temperature setpoint. That is, chillers are taken offline or brought online when the total capacity of the chillers is either excessive or inadequate as compared to the cooling load. To this end, the conditioning plant 104 may include relays and valves that allow the conditioning plant controller 114 to selectively apply power to each chiller 118 and one or more pumps 122 serving the chiller 118, and to route coolant and working fluid through or around the chiller 118 depending on whether the chiller is online or offline. Thus, chillers are sequentially brought online in response to increases in the cooling load presented by the building plant 102 exceeding chiller group capacity, and taken offline in response to decreases in the cooling load presented by the building plant 102 resulting in excessive chiller group capacity as needed to maintain the working fluid setpoint.

Chillers have a "performance curve" that reflects the efficiency of the chiller being higher at certain thermal loads than others. This performance curve not only varies between different types and model of chiller, but also between individual chillers of the same type and for a specific chiller as it ages. The load being carried by a chiller may be measured in "tons of refrigeration", with one ton of refrigeration (tR) being a thermal transfer rate that would freeze 2,000 lbs. of water at 0° C., or melt 2000 lbs. of ice at 0° C., in 24 hours. One ton of refrigeration is equivalent to an energy transfer rate (or power) of approximately 12,000 BTU/hour or 3.5 kilowatts (kW). One metric for characterizing the efficiency of a chiller is the ratio of the amount of power being consumed P (e.g., in kW) to the thermal transfer rate R in units of refrigeration (e.g., tR) being produced by that power:

$$E = \frac{P}{R} \qquad \text{Eqn. 1}$$

with a lower efficiency ratio E indicating a higher thermal transfer efficiency (i.e., a higher rate of refrigeration per watt of electricity) than a higher efficiency ratio E. For the sake of clarity, power consumed P in kW divided by thermal transfer rate R in tR is used consistently herein to characterize chiller efficiency. However, it should be understood that other metrics for characterizing chiller efficiency could be used, such as thermal transfer rate R divided by power consumed P. The efficiency ratio E may also refer to a cost C of the power consumed divided by the thermal transfer rate R, an amount of a pollutant emitted M divided by the thermal transfer rate R, or any other suitable parameter divided by the thermal transfer rate. Likewise, units of measurement other than watts and tons or refrigeration could be used, such as horsepower, ergs per second, foot-pounds per minute, calories per hour, BTU per hour, etc. Thus, embodiments of the invention are not limited to any particular type of efficiency (e.g., energy efficiency, cost efficiency, pollution efficiency, etc.) or units of measurement.

A performance curve is typically published by the chiller manufacturer for a given set of operating conditions. However, the measured performance curve of a chiller may deviate from the published data due to deficiencies within certain chiller processes, which may be recognizable base on certain chiller diagnostics. Environmental conditions may also affect the performance curve of a chiller. For example, the performance curve of a chiller typically changes as ambient conditions and thermal load demand change. Embodiments of the invention may maximize overall chiller group efficiency by determining the individual performance curves over a spectrum of actual operating conditions. This chiller performance information may be used to determine when to bring individual chillers online and take them offline to keep each chiller operating at the most efficient point along the performance curve possible while also meeting the thermal load of the building plant.

Figure 2:
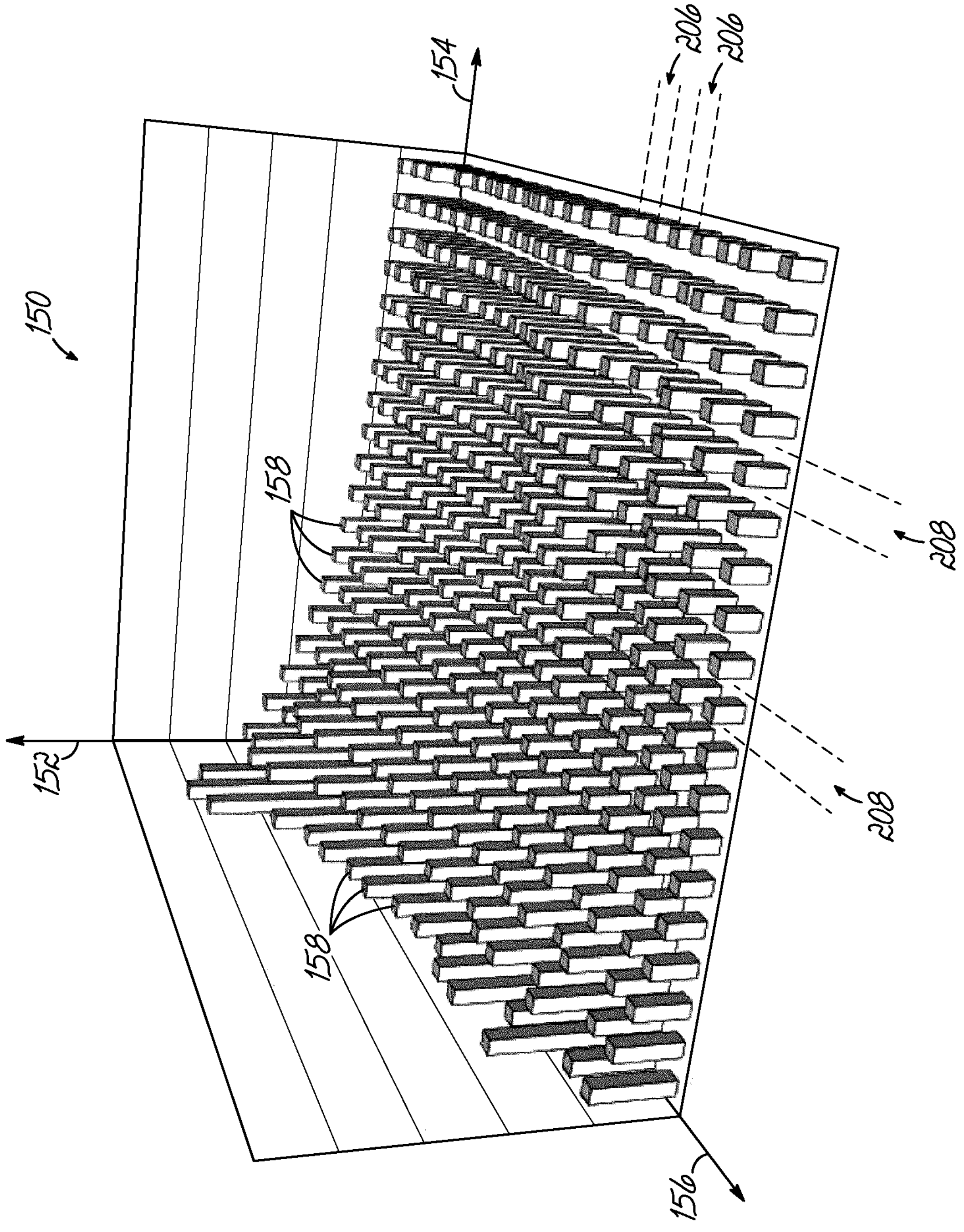
FIG. 2 is a graphical view illustrating exemplary performance data for a chiller of FIG. 1.

FIG. 2 depicts a three-dimensional graph 150 illustrating exemplary performance data for a chiller. The graph 150 includes a vertical axis 152 corresponding to the efficiency ratio E of the chiller, one horizontal axis 154 corresponding to the thermal load the chiller is carrying, another horizontal axis 156 corresponding to an operating condition of the chiller, and a plurality of bars 158 each representing the efficiency ratio E of the chiller at a specific thermal load and operating condition. The operating condition of the chiller may include one or more of ambient temperature, temperature of the coolant received from or provided to the cooling towers 120 or heating load, temperature of the working fluid received from or provided to the building plant 102, temperature difference between the temperature of the coolant and the temperature of the working fluid (i.e., "chiller lift"), or any other suitable operating condition. Each bar 158 may thereby define a point on, or discrete region of, a performance curve. Thus, performance curves for the chiller may be defined based on the performance data represented by the bars 158 of graph 150. Each performance curve may, in turn, define the efficiency ratio E verses thermal transfer rate R of the chiller at a specific operating condition or within an operating condition range.

Chiller performance data may be determined over time by monitoring various chiller parameters, and storing the data in a database. For example, the thermal transfer rate R being provided by an individual chiller 118 at any given time may be determined based on the flow-rate, specific heat, and temperature change of the working fluid flowing through the chiller 118. The efficiency ratio E for a chiller may be determined by measuring the power consumption P of the chiller 118 (e.g., with a dedicated electric meter), and dividing the power consumption P by the thermal transfer rate R. The operating condition may be determined based on one or more sensor readings, e.g., the temperature of the coolant received from or provided to the chiller 118 by the cooling towers 120 or heating load, the ambient air temperature and humidity, the temperature of the working fluid received from or provided to the building plant 102, or any other suitable sensor reading. This data may be compiled over time for each chiller 118 of HVAC system 100, and performance curves updated as the performance of the chiller 118 changes over time. For embodiments in which an efficiency other than power efficiency is optimized, the power consumption P may be converted into another parameter, such as the cost C of the power consumed, or the amount of the pollutant emitted M to determine the efficiency ratio E. These conversions may be made, for example, using lookup tables, by querying databases for current utility rates or sources of electrical power (e.g., coal, gas, wind turbine, hydroelectric, solar, nuclear etc.), or using any other suitable means.

Figure 3:
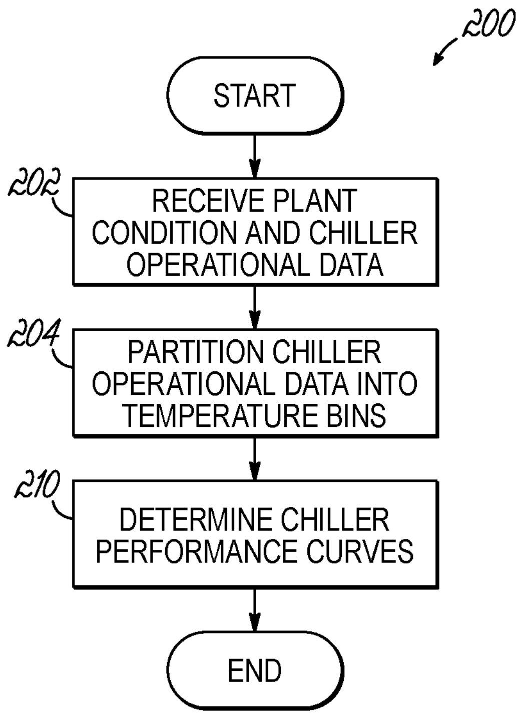
FIG. 3 is a flowchart of a process for obtaining the chiller performance data of FIG. 2.

FIG. 3 depicts a flowchart illustrating a chiller characterization process 200 that may be implemented by the BAS 106, a computer in communication with the BAS 106 or that otherwise has access to the chiller operational data database, the conditioning plant controller 114, or any other suitable computing system. Referring to FIG. 3, and with continued reference to FIG. 2, in block 202, the process 200 may receive plant condition and chiller operational data. This data may include HVAC system temperatures, chiller operating temperatures, chiller performance variables, etc. The chiller operational data may be acquired in real time using the BAS 106, e.g., using the Building Automation and Control Network (BACnet) Internet Protocol (IP) industrial communication protocol. Specific plant condition and chiller operational data may include, but is not limited to, coolant flow rate and temperature at the coolant inlet and coolant outlet of each chiller, working fluid flow rate and temperature at the working fluid inlet and working fluid outlet of each chiller, ambient air flow rate, temperature, and humidity (e.g., at the intake and output ducts of each cooling tower or chiller), power consumption (e.g., of the compressor, pumps, and fans serving each chiller, etc.), the total thermal load of the building plant 102, weather conditions (temperature, humidity, barometric pressure, cloud cover, wind, etc.), or any other suitable plant condition and chiller operational data. This data may be sampled at regular intervals (e.g., once a minute) and stored for a predetermined period of time (e.g., one or more years).

In block 204, the process 200 may partition the chiller operational data into a plurality of operating condition bins 206, e.g., 20 bins. The efficiency ratio E of each chiller may then be determined for operation in each of a plurality of thermal load level bins 208 (e.g., 19 bins) in each operating condition bin 206. The percent load of a chiller may be determined as the current operating tons divided by design tonnage, multiplied by 100. Temperature or other operating condition data acquired during operation of the chiller may be used to dictate the operating condition bin in which a chiller is currently running. The efficiency ratio E may be measured, for example, in kilowatts-per-ton, and may be maintained as a running average for the percent load of the chiller.

In block 210, the process 200 may generate performance curves based on the binned operational data. The performance curves may be determined, for example, using polynomial regression on the operational data in each operating condition bin to obtain performance coefficients $\beta_x$. The performance coefficients $\beta_x$ may define a polynomial equation that provides the performance of the chiller at any thermal load while the chiller is operating under an operating condition within the operating condition bin. By way of example, a third order performance curve may be provided by the following polynomial equation:

$$E(l)=\beta_0+\beta_1\times l+\beta_2\times l^2+\beta_2\times l^3 \qquad \text{Eqn. 2}$$

Where E(l) represents the efficiency function of a chiller, and I represents the thermal transfer rate of/thermal load on the chiller. By way of another example, the performance curves may be determined using point-to-point linear interpolation to estimate the efficiency ratio E of a chiller between two or more known points of the chiller performance curve, e.g., between two points of the three-dimensional graph 150 on either side of the operating condition being analyzed.

Figure 4:
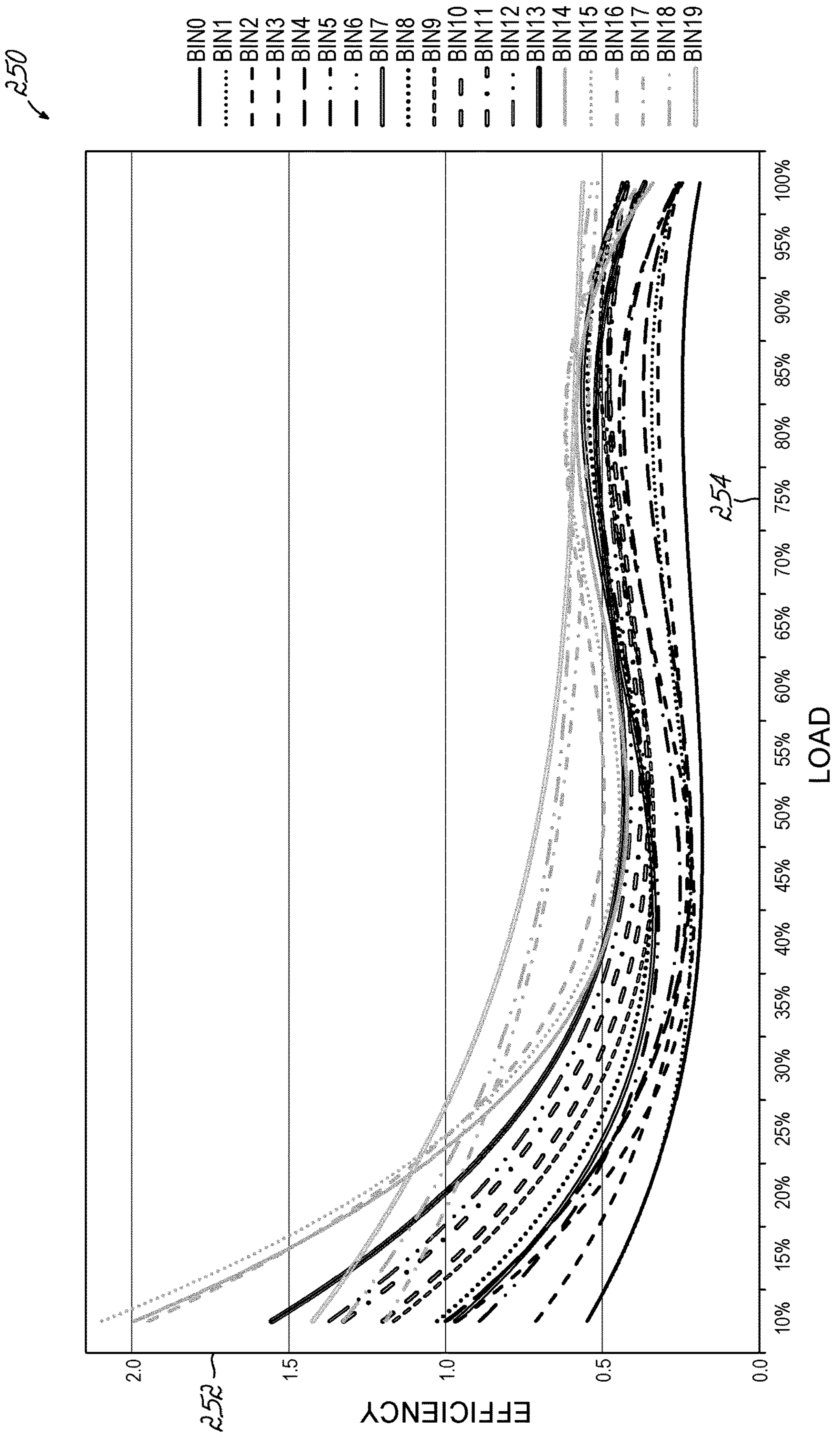
FIG. 4 is a graphical view illustrating a plurality of exemplary performance curves that may be determined from the data of FIG. 2 showing chiller efficiency verses chiller load for a plurality of operating conditions.

By way of example, FIG. 4 depicts a graph 250 including a vertical axis 252 corresponding to the efficiency ratio E of the chiller (e.g., in kW/tR), a horizontal axis 254 corresponding to the thermal load carried by the chiller (e.g., as a percentage of the maximum chiller capacity in tons), and a plurality of exemplary performance curves each corresponding to a different operating condition bin 0-19. Each of the performance curves may be provided by a respective polynomial expression determined by process 200 based on operational data obtained while the chiller was operating within the respective operating condition bin, using linear interpolation of the operational data, or by any other suitable means. Each performance curve may correspond to a different operating condition bin, and provide an indication of the efficiency verses thermal transfer rate R of the chiller when operating within that operating condition bin.

Figure 5:
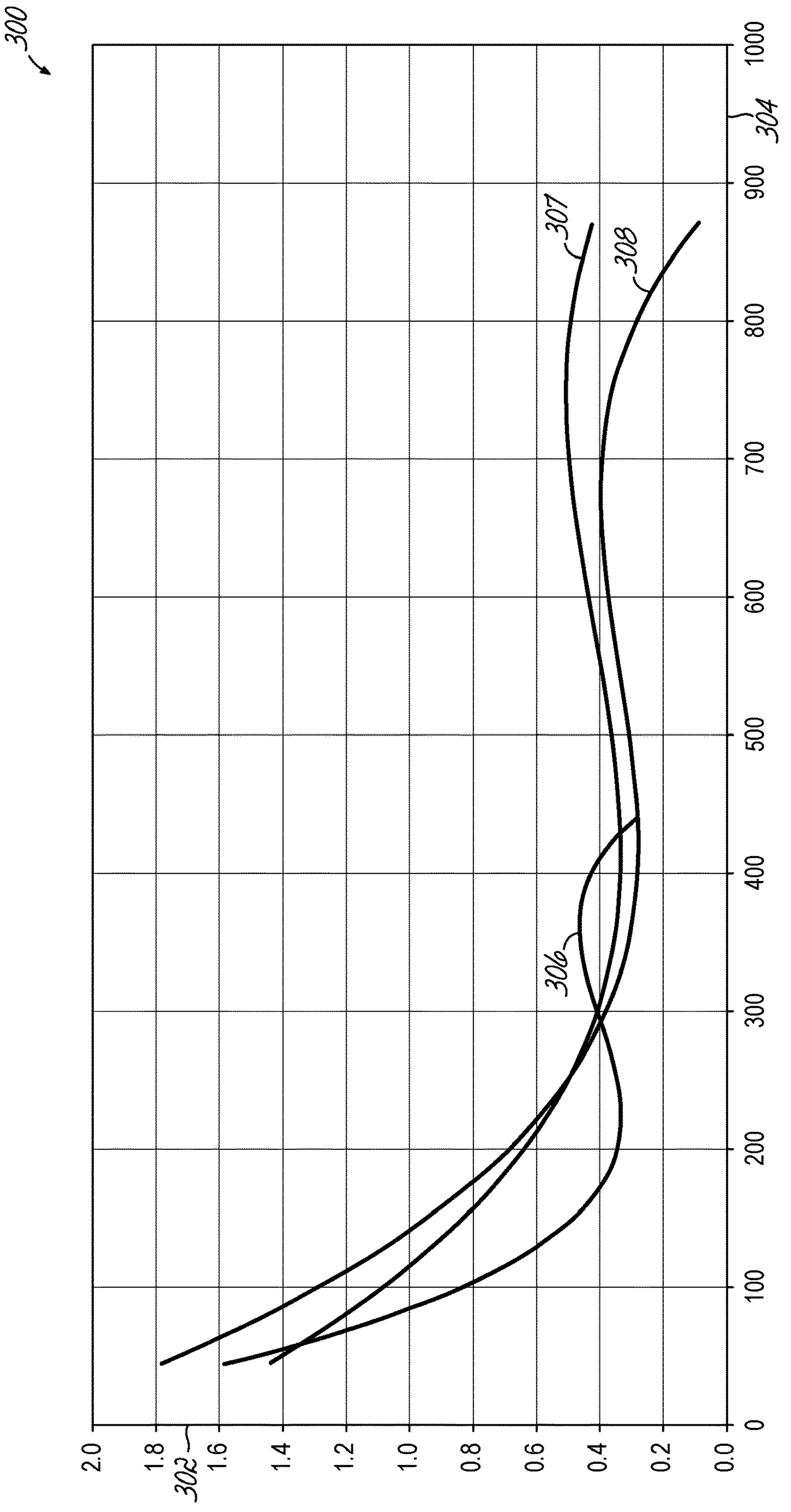
FIG. 5 is a graphical view illustrating a plurality of exemplary performance curves each showing efficiency verses thermal load for a chiller of a chiller group.

FIG. 5 depicts a graph 300 including a vertical axis 302 corresponding to the efficiency ratio E of the chiller (e.g., in kW/tR), a horizontal axis 304 corresponding to the thermal load placed on the chiller (e.g., in tR), and a plurality of exemplary performance curves 306-308 each corresponding to a different chiller in a group of chillers (e.g., three chillers) at a specific operating condition bin for the chiller. The exemplary chiller group consists of one small chiller A rated at 440 tR and associated with performance curve 306, a large chiller B rated at 860 tR and associated with performance curve 307, and another large chiller C also rated at 860 tR and associated with performance curve 308.

For a given thermal load (e.g., 700 tR), there may be multiple combinations of chillers with sufficient capacity to satisfy the load (e.g., chiller B only, chiller C only, chillers A and B, chillers A and C, chillers B and C, or chillers A, B, and C). In the case of only running a single chiller 118, the efficiency of the chiller group 116 may be determined based on the value of the performance curve of the respective chiller at the specified thermal load. For example, at a refrigeration rate of 700 tR, chiller B may have an efficiency ratio E of about 0.500 kW/tR, and chiller C may have an efficiency ratio E of about 0.463 kW/tR. When running two chillers (e.g., chillers A and B), there may be a question of how to divide the thermal load between chillers. In this case, a weighted average efficiency ratio E of the chillers may be determined as:

$$E_A(l_A)\times\frac{l_A}{l_T}+E_B(l_B)\times\frac{l_B}{l_T} \qquad \text{Eqn. 3}$$

where $E_A$ is the efficiency function of chiller A, $l_A$ is the thermal load place on chiller A, $E_B$ is the efficiency function of chiller B, $l_B$ is the thermal load place on chiller B, and $l_T$ is the total thermal load (e.g., 700 tR), as provided by:

$$l_T=l_A+l_B \qquad \text{Eqn. 4}$$

Because there are two unknowns ($l_A$, $l_B$), and two equations (3, 4), there may be a single solution to our exemplary scenario. Plugging the resulting values into equation (3) produces the following result:

$$0.337\times\frac{220}{700}+0.290\times\frac{480}{700}=0.305 \qquad \text{Eqn. 5}$$

Thus, running both chillers A and C would provide higher efficiency (lower efficiency ratio) than running either chiller B or chiller C alone. A similar exercise may be performed for combinations of chillers A and B as well as B and C. In the above example, the combination of chillers A and B provides an efficiency ratio $E_{AC\_opt}(700)\approx 0.360$, and the combination of chillers B and C provides an efficiency ratio $E_{BC\_opt}(700)\approx 0.394$.

To determine how to spread the loads between all three chillers for the combination of A, B, and C, a function $E_{AB}(l_{AB})$ may be determined by solving equations 6 and 7 below:

$$E_{AC}(l_{AC})=E_A(l_A)\times\frac{l_A}{l_{AC}}+E_C(l_C)\times\frac{l_C}{l_{AC}} \qquad \text{Eqn. 6}$$

$$l_{AC}=l_A+l_C \qquad \text{Eqn. 7}$$

for a plurality of values of $l_{AC}$ between ($l_{A\_min}+l_{C\_min}$) and ($l_{A\_max}+l_{C\_max}$), or between a minimum thermal load of about 100 Rt and a maximum thermal load of about 1300 Rt. To determine how to spread the loads between all three chillers for the combination of A, B, and C, a function $E_{AC}(l_{AC})$ may be determined by solving equations 6 and 7 below for a plurality of values of $l_{AC}$ between ($l_{A\_min}+l_{C\_min}$) and ($l_{A\_max}+l_{C\_max}$):

$$E_{ABC}(l_T) = E_{AC}(l_{AC}) \times \frac{l_{AC}}{l_T} + E_B(l_B) \times \frac{l_B}{l_T} \quad \text{Eqn. 6}$$

$$l_T = l_{AC} + l_B \quad \text{Eqn. 7}$$

Once the optimal load split between chillers A and B is known for each of a plurality of thermal loads which the pair of chillers can support, a polynomial regression, interpolation, or other suitable process may be performed on the results to provide an expression for optimal efficiency of the A-B chiller pair across a range of thermal loads. This equation may be analogous to the equation for a single chiller, except that the thermal load is shared between the two chillers in a predetermined (e.g., optimal) manner at each thermal load. The function $E_{AB}(l_{AB})$ may then be used to determine the optimal split between the A-B pair and chiller C in the same way as described above for determining the load-split between chillers A and B. Thus, it may be possible to determine the optimal thermal load-split between all three chillers A, B, and C for any given load. Similar operations may be applied to determine optimal thermal load-splits between any number of chiller combinations at any number of thermal loads, and the results stored in a database for use in staging chillers in the group of chillers.

In an alternative embodiment of the invention, a numerical analysis of the group efficiency for each of a plurality of thermal loads may be performed. This numerical analysis may determine the group efficiency for each possible combination of chillers, each possible thermal load distribution between each combination of chillers, and each of a plurality of operating conditions of each combination of chillers. These group efficiencies may be determined using efficiency ratio functions $E_x(l)$ for each of the chillers, which may be determined from operational data collected on each chiller as described above. The group efficiencies of each combination of chillers and operating conditions may also be determined directly from the operational data. This data may be updated regularly, stored in a database, and used to control staging of the chillers 118.

For n equal to the current number of chillers in operation, comparisons of estimated efficiency between different combinations of chillers and thermal load distributions may be performed in an on-going basis (e.g., in real-time) to estimate the overall efficiency the chiller group for n+1 and n−1 online chillers. The results of this analysis may then be used to control staging of the chillers in the group.

In cases where the thermal load on the chiller group includes both a cooling load and a heating load, the above equations may be solved separately for each of the cooling and heating loads. An adjusted efficiency may then be determined for servicing both the cooling and heating loads, e.g., by calculating a total energy consumption for servicing both loads. This total energy consumption may include energy consumed by heat sources other than the recovery chiller (e.g., a boiler) which would be reduced by operation of the heat recovery chiller. The amount of the heating demand satisfied by one or more heat recovery chillers verses the other heat sources, and the amount of the cooling demand satisfied by one or more heat recovery chillers verses standard chillers may be adjusted iteratively to optimize the adjusted efficiency of the chiller group. Operating the chiller group to optimize this adjusted efficiency may allow both the cooling load and heating load to be satisfied in a way that provides the highest overall efficiency at the building level. To facilitate these calculations, all sources of energy (e.g., electricity, natural gas, heating oil, etc.) may be converted to standard units of power and thermal transfer rates.

In an exemplary embodiment of the invention, heating load demand may be determined by a hot water system flow, supply temperature, and return temperature. During system operations in which there is a simultaneous heating and cooling load, a chiller sequencer may use the heating load demand calculation to stage on heat recovery chillers to provide the maximum amount of heat that can be reclaimed from the heat recovery chillers at the highest chilled water efficiency, e.g., lowest chilled water kW per ton.

Although the above description is directed primarily to optimization of energy efficiency, it should be understood that other types of efficiency may be used to optimize performance of the conditioning plant 104. For example, efficiency may be optimized by minimizing the cost of the energy consumed, minimizing the emission of carbon dioxide ($CO_2$) or other greenhouse gasses, or minimizing any other undesirable effect of operating a chiller group. For example, heat recovery chillers may be selectively activated to minimize $CO_2$ emissions based on carbon weighting (e.g., in grams $CO_2$ per kW) of each energy source available to satisfy the heating and cooling thermal loads. Maximum fuel and carbon savings may be achieved, for example, by calling for the most efficient quantity and order of heat recovery chillers suitable to meet both cooling and heating requirements.

Cost weighting (e.g., in dollars per kW) may be applied based on the current price of each available source of energy. The optimal thermal load-split between the chillers and (in the case of heating loads) other sources of heat may then be determined based on minimizing a cost function. Determining the cost function may include calculating current hot water operating costs for each source of heat base on source efficiency, required heat output, and the energy utility rate. For example, in cases where both a gas boiler and an electrically powered heat recovery chiller are available, the chiller sequencer may use both the gas utility rate and the electric utility rate to determine a current chilled water operating cost. The chiller sequencer may compare both the hot water and chilled water operating costs and determine the most efficient quantity and staging order for both heat recovery and chilled water chillers to yield the lowest net operating costs between both the hot water and chilled water systems.

Figure 6:
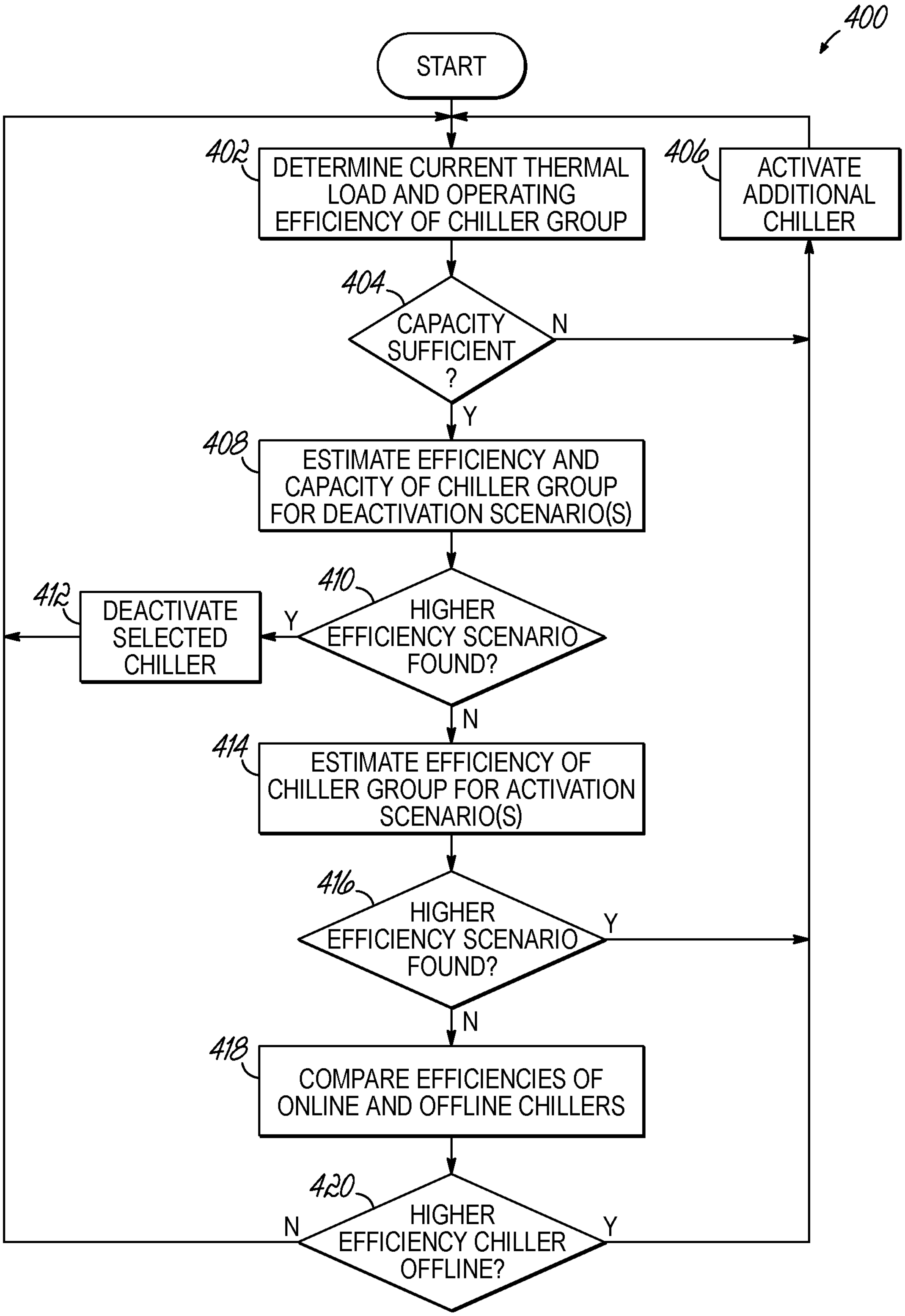
FIG. 6 is a flowchart of a process for staging chillers in a chiller group.

FIG. 6 depicts a flowchart illustrating an exemplary chiller staging process 400 in accordance with an embodiment of the invention. The process 400 may be executed by the BAS 106, conditioning plant controller 114, or any other suitable computing system, to control staging and loading of chillers in a chiller group. In block 402, the staging process 400 may determine the current thermal load on, and the efficiency of, the chiller group. The total thermal load on the chiller group may be determined, for example, by determining the thermal load on each chiller, and then summing these thermal loads. The thermal load may also be determined based on the temperature difference between the working fluid being received from the building plant and the working fluid being returned to the building plant, in combination with the flow rate and specific heat of the working fluid. In any case, once the thermal load has been determined, the current efficiency of the chiller group may be determined by measuring the total power consumption of the chiller group. The total power consumption may include the power consumption of other sources of heat in cases where there is a heating load. Depending on the type of efficiency being used to optimize staging, the total power consumption may be used as a denominator, or first converted into another form, such as grams of $CO_2$, dollars, or some other units of measurement. In any case, the total thermal load may be divided by the selected units of measurement to generate the efficiency. The efficiency of the chiller group may also be determined by determining the efficiency of each chiller online, and calculating an average efficiency weighted by the thermal transfer rate being provided by each chiller.

In block 404, the staging process 400 may determine if the capacity of the online chillers is sufficient to meet the current thermal load. This may be determined, for example, based on whether the conditioning plant 104 is able to maintain the setpoint temperature of the working fluid. If the capacity of the online chillers is not sufficient to meet the thermal load ("NO" branch of decision block 404), the staging process 400 may proceed to block 406 activate an offline chiller. If the capacity of the online chillers is sufficient to meet the thermal load ("YES" branch of decision block 404), the process 400 may proceed to block 408.

In block 408, the staging process 400 may estimate the efficiency and capacity of the online chiller group for one or more scenarios in which one of the currently online chillers is taken offline. This determination may consider, for each online chiller, whether the remaining online chillers would have sufficient capacity to satisfy the thermal load if the online chiller in question was taken offline. Assuming that the remaining capacity of the online chillers would be sufficient, the process 400 may further estimate what the group efficiency of the remaining online chillers would be if the chiller in question was taken offline.

Figure 7:
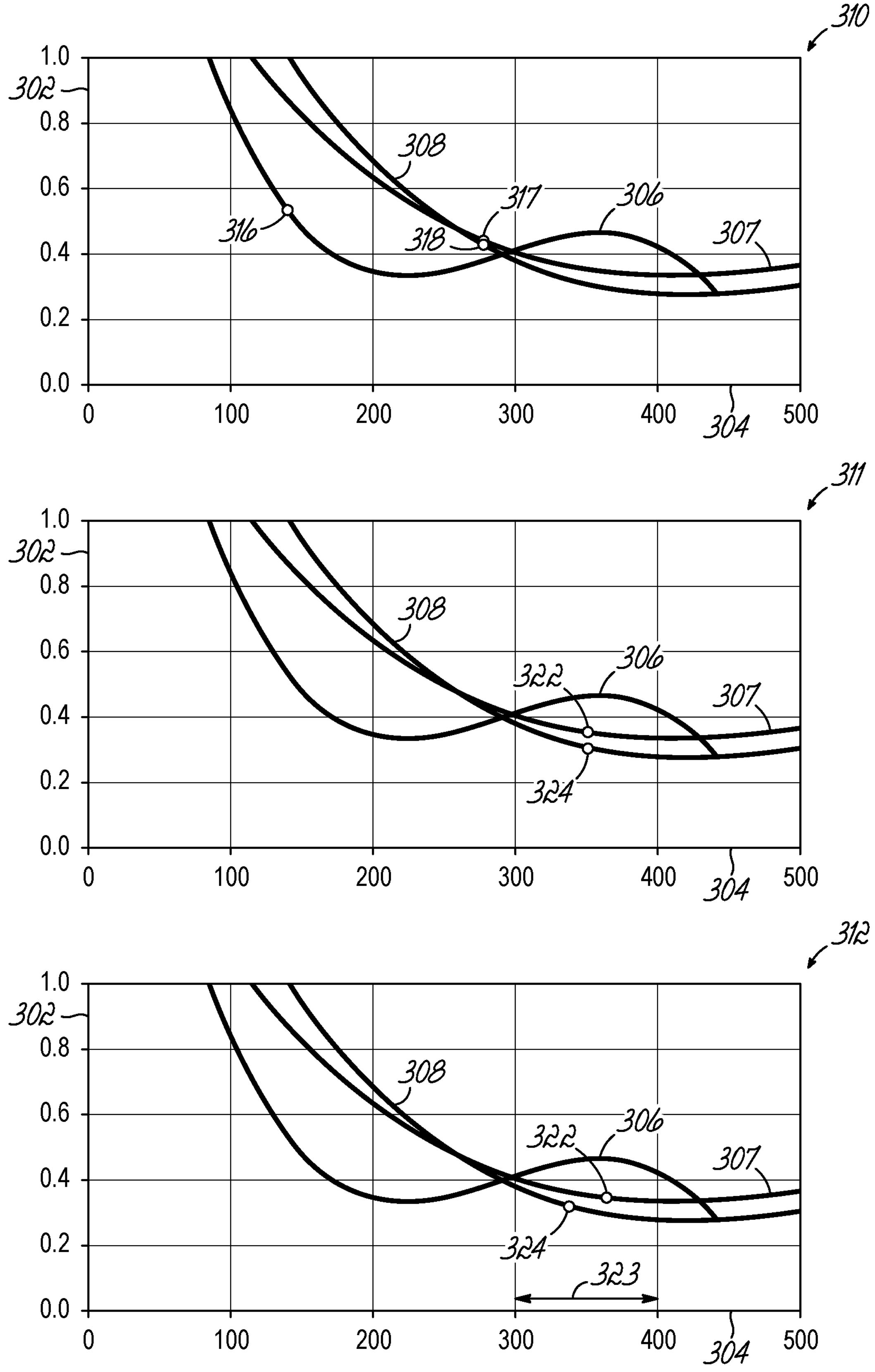
FIG. 7 is a graphical view showing a plurality of load distributions for the chillers of FIG. 5 under an operational scenario in which the process of FIG. 6 increases the group efficiency of the chiller group by taking a chiller offline.

By way of an example of improving a group efficiency by taking a chiller offline, FIG. 7 depicts a portion of the graph 300 illustrating different thermal load distributions 310-312 between the chillers A, B, C for a 700 tR thermal load. In the initial thermal load distribution 310, each chiller A, B, C, is online and is carrying a respective thermal load 316-318 that sums to the total load of 700 tR. Specifically, the thermal load 316 on the small chiller A is about 140 tR, and the thermal load 317, 318 on each of the large chillers B, C is about 280 tR. Thus, each chiller A, B, C is running at about 32% of its capacity, and the group efficiency is about 0.559 kW/tR.

Thermal load distribution 311 depicts a potential loading of the chillers if chiller A is taken offline. The resulting thermal load is evenly distributed as thermal loads 322, 324 on the large chillers B, C. The group efficiency for this thermal load distribution is about 0.353 kW/tR, which is better than the previous thermal load distribution 310. A further optimization of the thermal load distribution 311 may be performed by modifying the load balance between the remaining online large chillers B, C. For example, moving the thermal loads 322, 324 in opposite directions along their respective performance curves 307, 308 within a range 323 of thermal transfer rates may keep the total load on the chiller group constant (e.g., =700 tR). At the same time, the change in thermal load distribution may alter the group efficiency of the chillers B, C. In particular, the relative slopes of the performance curves 307, 308 may provide an indication of which way to move the thermal loads 322, 324 to improve group efficiencies. For example, by reducing the thermal load 324 on the performance curve 308 having the more negative slope, and increasing the thermal load 322 on the performance curve 307 having the less negative slope. As shown in the final thermal load distribution 312, increasing the thermal load 322 on chiller B to about 355 tR and reducing the thermal load 324 on chiller C to about 345 tR may improve the group efficiency slightly to 0.349 kW/tR.

In block 410, the staging process 400 may determine if a scenario has been found in which a higher group efficiency can be achieved by taking a chiller offline. If higher group efficiency can be achieved by taking a chiller offline ("YES" branch of decision block 410), the staging process 400 may proceed to block 412, deactivate the chiller in question, adjust the thermal load distribution, and return to block 402. If a higher group efficiency cannot be achieved by taking a chiller offline ("NO" branch of decision block 410), the staging process 400 may proceed to block 414.

Figure 8:
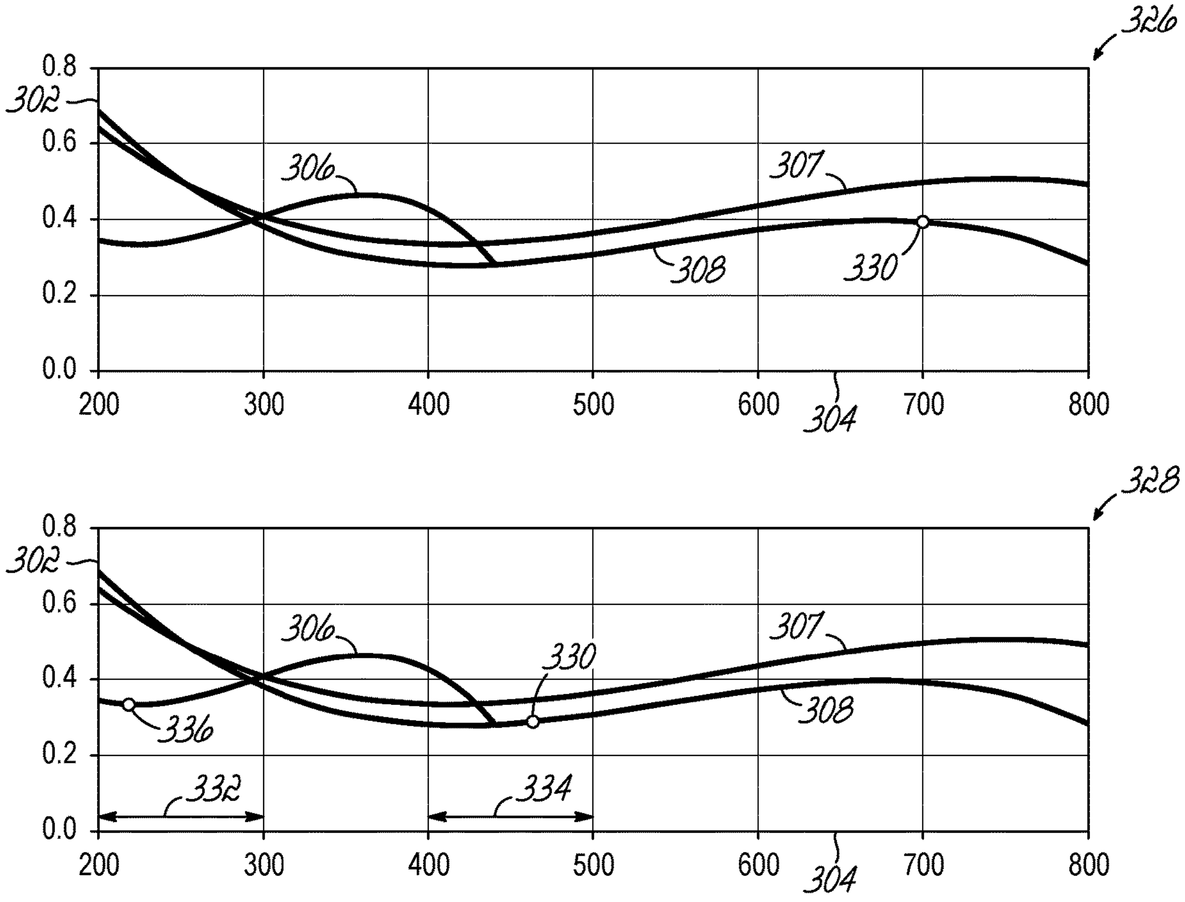
FIG. 8 is a graphical view showing a plurality of load distributions for the chillers of FIG. 5 under an operational scenario in which the process of FIG. 6 increases the group efficiency of the chiller group by bringing a chiller online.

In block 414, the staging process 400 may estimate the efficiency of the chiller group for one or more scenarios in which an offline chiller is brought online. By way of an example of bringing an extra chiller online to increase group efficiency, FIG. 8 depicts a portion of graph 300 illustrating different thermal load distributions 326, 328 between the chillers A, B, C for a 700 tR thermal load. In the initial thermal load distribution 326, chiller C is the only chiller online and is thus carrying a 700 tR thermal load 330. At this point on the performance curve 308, chiller C has an efficiency of about 0.391 kW/tR. The staging process 400 may analyze all possible combinations of chillers to determine the combination that will provide the best group efficiency. In the present example, this analysis may conclude that activating chiller A and dividing the thermal load about between chillers A and C will provide the best group efficiency.

Using a part-load calculation, the staging process 400 may determine load ranges 332, 334 over which each chiller A, C should operate when splitting the total thermal load. Each individual load range may cover thermal loads which would allow the chiller group being analyzed to handle the total thermal load. The load ranges may also, when possible, cover portions of the performance curves of their respective chillers where each chiller produces the best efficiency. The part-load calculation may predict the group efficiency of the online chillers A, C at various operating points in the load ranges to determine the optimal load distribution.

For a thermal load of 700 tR, chiller A may be analyzed over a range of 200 to 300 tR, and chiller C may be analyzed over a range of 400 to 500 tR. The part-load calculation may begin by dividing the total thermal load evenly between the online chillers as a percentage of their maximum capacity. Under the present scenario, this would lead to the load distribution 328 in which chiller A is operating at a thermal transfer rate 336 of about 235 tR, and chiller C is operating at a thermal transfer rate 330 of about 465 tR. At these thermal transfer rates 330, 336, each chiller would be operating at about 53-54 percent of its maximum capacity. For an efficiency having units of kW/tR, resulting group efficiency ratio under this load distribution 328 would be about 0.250 kW/tR, which is an improvement about 0.150 kW/tR over the efficiency ratio of running chiller C alone. Thus, load distribution 328 would save about 105 kW as compared to load distribution 326. These efficiency gains may be realized throughout the depicted operating tonnage ranges 332, 334, such that moving the thermal transfer rates 330, 336 within their respective ranges 334, 332 does not change the group efficiency significantly.

In block 416, the staging process 400 may determine if a scenario has been found in which a higher group efficiency can be achieved by bringing an offline chiller online. If such a scenario has been found, ("YES" branch of decision block 416), the staging process 400 may proceed to block 406, activate the chiller in question, adjust the load distribution accordingly, and return to block 402. If a higher group efficiency cannot be achieved by bringing a chiller online ("NO" branch of decision block 416), the staging process 400 may proceed to block 418.

In block 418, the staging process 400 may compare the efficiency of each online chiller to each offline chiller at the thermal transfer rate currently being provided by the online chiller. Thus, if no improvements in the efficiency were found by bringing an additional chiller online, or by taking an operational chiller offline, the staging process 400 may determine if it is possible to simply replace an online chiller with an offline chiller having a better efficiency. Based on this comparison of efficiencies of online and offline chillers, the staging process 400 may determine if an offline chiller could carry the same thermal load as an online chiller but at a higher efficiency, e.g., a lower kilowatt per ton (kW/tR), grams of $CO_2$ per ton, ($CO_2$/tR), dollars per ton ($/tR), etc.

Figure 9:
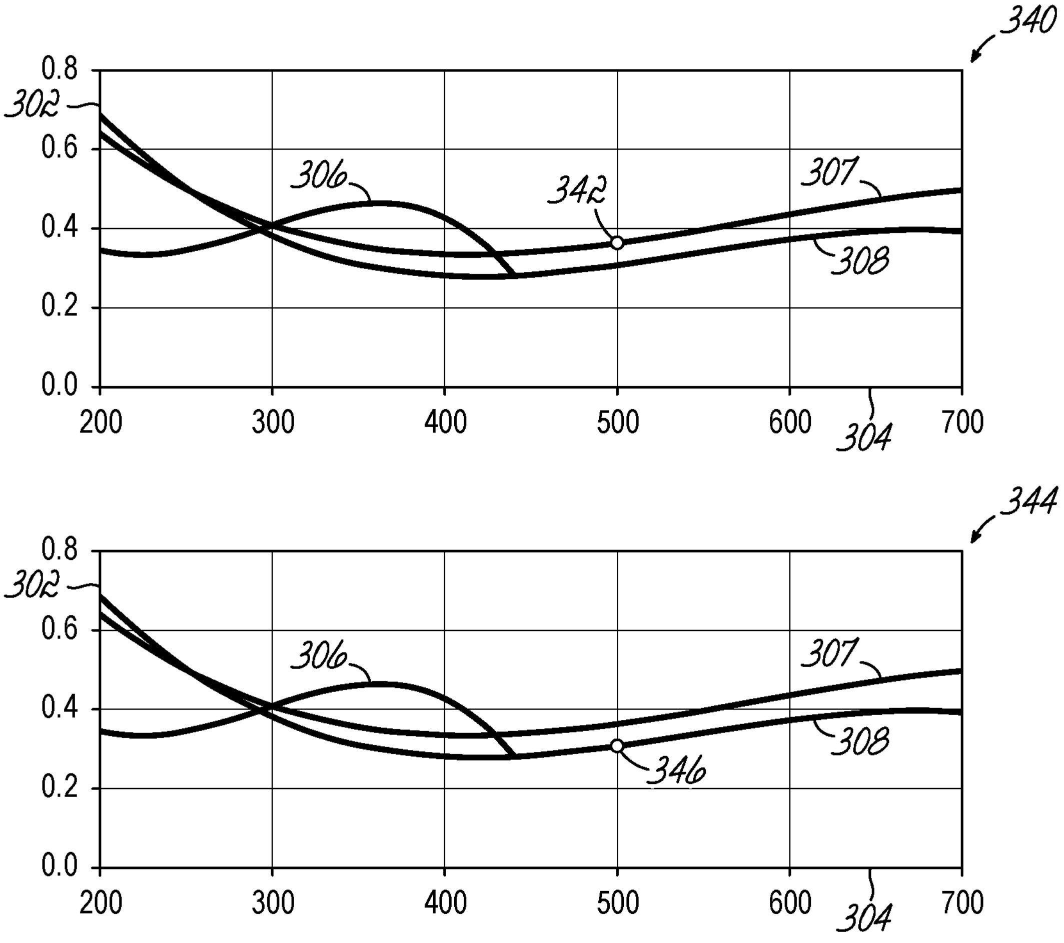
FIG. 9 is a graphical view showing a plurality of load distributions for the chillers of FIG. 5 under an operational scenario in which the process of FIG. 6 increases the group efficiency of the chiller group by bringing one chiller online, and taking another chiller offline.

By way of example where the efficiency is measured in kW/tR, FIG. 9 depicts a portion of graph 300 illustrating an initial load distribution 340 where chiller B is the only chiller online and is thus carrying a thermal load 342 of 500 tR, and a subsequent load distribution 344 in which chiller C is brought online to replace chiller B. As indicated by the performance curve 307 of chiller B, at a thermal load of 500 tR, chiller B has an efficiency of about 0.400 kW/tR. The staging process 400 may initially determine which offline chillers A, C could carry the thermal load being carried by the online chiller B. In this example, offline chiller A is not capable of handling a 500 tR thermal load, so it is not considered. However, offline chiller C would be able to handle a 500 tR thermal load. As indicated by thermal load 346 on performance curve 308 of chiller C, at a thermal load of 500 tR, chiller C has an efficiency of about 0.300 kW/tR. Thus, in this example, swapping out chiller B for chiller C would result in an expected improvement of 0.100 kW/tR. This would produce a power savings of 50 kW.

In block 420, based on the results of the efficiency analysis between the online and offline chillers, the staging process 400 may determine if a higher efficiency chiller is offline. If a higher efficiency chiller is offline ("YES" branch of decision block 420"), the staging process 400 may proceed to block 406 and bring the higher efficiency chiller online. The staging process 400 may then deactivate the less efficient chiller B, or rely on the chiller deactivation analysis provided by blocks 408, 410, and 412 to take the less efficient chiller B offline.

Figure 10:
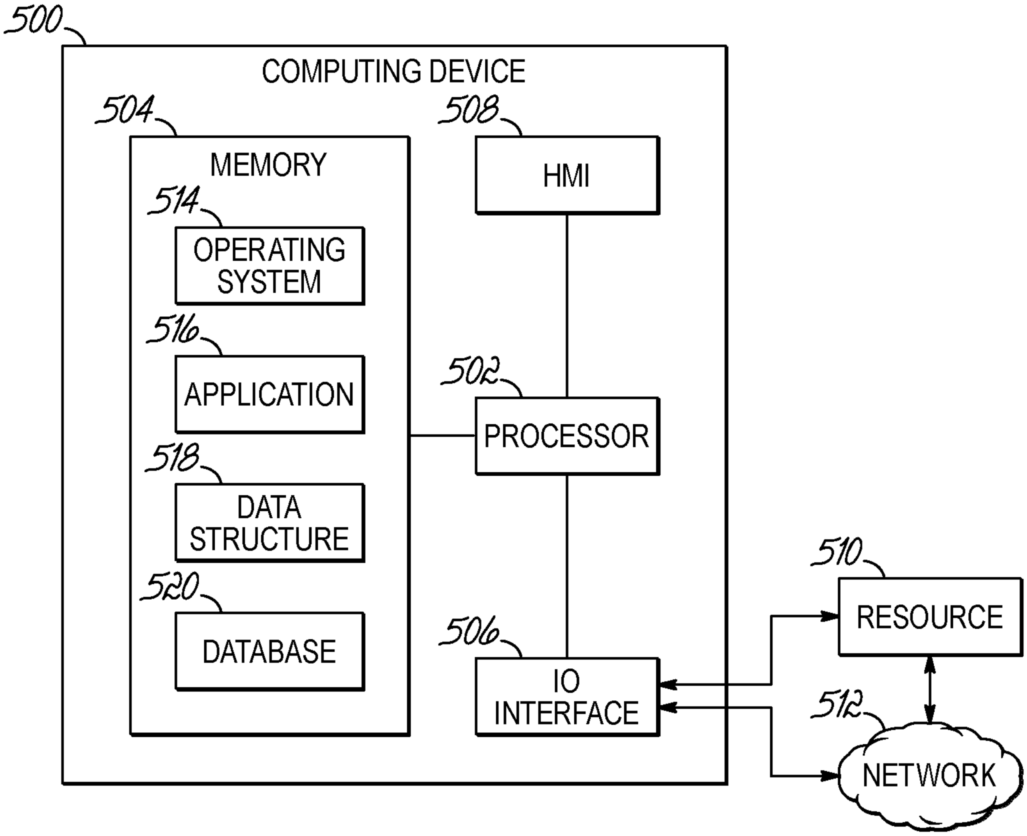
FIG. 10 is a diagrammatic view of a computer that may be used to implement or generate one or more of the components, processes, or graphs shown in FIGS. 1-9.

Referring now to FIG. 10, embodiments of the invention described above, or portions thereof, may be implemented using one or more computer devices or systems, such as exemplary computer 500. The computer 500 may include a processor 502, a memory 504, an input/output (I/O) interface 506, and a Human Machine Interface (HMI) 508. The computer 500 may also be operatively coupled to one or more external resources 510 via the network 512 or I/O interface 506. External resources may include, but are not limited to, servers, databases, mass storage devices, peripheral devices, cloud-based network services, or any other resource that may be used by the computer 500.

The processor 502 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions stored in memory 504. Memory 504 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or data storage devices such as a hard drive, optical drive, tape drive, volatile or non-volatile solid state device, or any other device capable of storing data.

The processor 502 may operate under the control of an operating system 514 that resides in memory 504. The operating system 514 may manage computer resources so that computer program code embodied as one or more computer software applications, such as an application 516 residing in memory 504, may have instructions executed by the processor 502. In an alternative embodiment, the processor 502 may execute the application 516 directly, in which case the operating system 514 may be omitted. One or more data structures 518 may also reside in memory 504, and may be used by the processor 502, operating system 514, or application 516 to store or manipulate data.

The I/O interface 506 may provide a machine interface that operatively couples the processor 502 to other devices and systems, such as the external resource 510 or the network 512. The application 516 may thereby work cooperatively with the external resource 510 or network 512 by communicating via the I/O interface 506 to provide the various features, functions, applications, processes, or modules comprising embodiments of the invention. The application 516 may also have program code that is executed by one or more external resources 510, or otherwise rely on functions or signals provided by other system or network components external to the computer 500. Indeed, given the nearly endless hardware and software configurations possible, persons having ordinary skill in the art will understand that embodiments of the invention may include applications that are located externally to the computer 500, distributed among multiple computers or other external resources 510, or provided by computing resources (hardware and software) that are provided as a service over the network 512, such as a cloud computing service.

The HMI 508 may be operatively coupled to the processor 502 of computer 500 to allow a user to interact directly with the computer 500. The HMI 508 may include video or alphanumeric displays, a touch screen, a speaker, and any other suitable audio and visual indicators capable of providing data to the user. The HMI 508 may also include input devices and controls such as an alphanumeric keyboard, a pointing device, keypads, pushbuttons, control knobs, microphones, etc., capable of accepting commands or input from the user and transmitting the entered input to the processor 502.

A database 520 may reside in memory 504, and may be used to collect and organize data used by the various systems and modules described herein. The database 520 may include data and supporting data structures that store and organize the data. In particular, the database 520 may be arranged with any database organization or structure including, but not limited to, a relational database, a hierarchical database, a network database, or combinations thereof. A database management system in the form of a computer software application executing as instructions on the processor 502 may be used to access the information or data stored in records of the database 520 in response to a query, which may be dynamically determined and executed by the operating system 514, other applications 516, or one or more modules.

In general, the routines executed to implement the embodiments of the invention, whether implemented as part of an operating system or a specific application, component, program, object, module or sequence of instructions, or a subset thereof, may be referred to herein as "computer program code," or simply "program code." Program code typically comprises computer-readable instructions that are resident at various times in various memory and storage devices in a computer and that, when read and executed by one or more processors in a computer, cause that computer to perform the operations necessary to execute operations or elements embodying the various aspects of the embodiments of the invention. Computer-readable program instructions for carrying out operations of the embodiments of the invention may be, for example, assembly language, source code, or object code written in any combination of one or more programming languages.

Various program code described herein may be identified based upon the application within which it is implemented in specific embodiments of the invention. However, it should be appreciated that any particular program nomenclature which follows is used merely for convenience, and thus the invention should not be limited to use solely in any specific application identified or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a computer program product in a variety of different forms. In particular, the program code may be distributed using a computer-readable storage medium having computer-readable program instructions thereon for causing a processor to carry out aspects of the embodiments of the invention.

Computer-readable storage media, which is inherently non-transitory, may include volatile and non-volatile, and removable and non-removable tangible media implemented in any method or technology for storage of data, such as computer-readable instructions, data structures, program modules, or other data. Computer-readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store data and which can be read by a computer. A computer-readable storage medium should not be construed as transitory signals per se (e.g., radio waves or other propagating electromagnetic waves, electromagnetic waves propagating through a transmission media such as a waveguide, or electrical signals transmitted through a wire). Computer-readable program instructions may be downloaded to a computer, another type of programmable data processing apparatus, or another device from a computer-readable storage medium or to an external computer or external storage device via a network.

Computer-readable program instructions stored in a computer-readable medium may be used to direct a computer, other types of programmable data processing apparatuses, or other devices to function in a particular manner, such that the instructions stored in the computer-readable medium produce an article of manufacture including instructions that implement the functions, acts, or operations specified in the text of the specification, the flowcharts, sequence diagrams, or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, or operations specified in the text of the specification, flowcharts, sequence diagrams, or block diagrams.

The flowcharts and block diagrams depicted in the figures illustrate the architecture, functionality, or operation of possible implementations of systems, methods, or computer program products according to various embodiments of the invention. In this regard, each block in the flowchart or block diagrams may represent a module, segment, or portion of instructions, which comprises one or more executable instructions for implementing the specified logical function or functions.

In certain alternative embodiments, the functions, acts, or operations specified in the text of the specification, the flowcharts, sequence diagrams, or block diagrams may be re-ordered, processed serially, or processed concurrently consistent with embodiments of the invention. Moreover, any of the flowcharts, sequence diagrams, or block diagrams may include more or fewer blocks than those illustrated consistent with embodiments of the invention. It should also be understood that each block of the block diagrams or flowcharts, or any combination of blocks in the block diagrams or flowcharts, may be implemented by a special purpose hardware-based system configured to perform the specified functions or acts, or carried out by a combination of special purpose hardware and computer instructions.

The terminology used herein is for the purpose of describing particular embodiments only and is not intended to be limiting of the embodiments of the invention. As used herein, the singular forms "a", "an" and "the" are intended to include both the singular and plural forms, and the terms "and" and "or" are each intended to include both alternative and conjunctive combinations, unless the context clearly indicates otherwise. It will be further understood that the terms "comprises" or "comprising," when used in this specification, specify the presence of stated features, integers, actions, steps, operations, elements, or components, but do not preclude the presence or addition of one or more other features, integers, actions, steps, operations, elements, components, or groups thereof. Furthermore, to the extent that the terms "includes", "having", "has", "with", "comprised of", or variants thereof are used in either the detailed description or the claims, such terms are intended to be inclusive in a manner similar to the term "comprising".

While all the invention has been illustrated by a description of various embodiments, and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A method of staging a chiller group including a plurality of chillers having at least one heat recovery chiller, comprising:

determining a thermal load on the chiller group, the thermal load including a cooling load and a heating load;

determining a current efficiency of the chiller group;

determining an estimated efficiency of the chiller group after executing a staging operation including one of bringing an offline chiller online, taking an online chiller offline, or both bringing the offline chiller online and taking the online chiller offline, the estimated efficiency being determined based on a relationship between a thermal transfer rate of each chiller, a parameter related to a power consumption of each chiller, and a lift of each chiller;

determining an emissions caused by the chiller group based on the estimated efficiency thereof and by one or more boilers needed to satisfy the heating load; and staging the chiller group according to the staging operation by selectively activating the at least one heat recovery chiller to minimize the emissions based on emissions weighting of each energy source available to satisfy the heating load and the cooling load by calling for the most efficient quantity and order of heat recovery chillers suitable to meet both the cooling load and the heating load taking into account any contribution to the emissions by the one or more boilers and by causing the chiller group to one of bring the offline chiller online, take the online chiller offline, or both bring the offline chiller online and take the online chiller offline.

2. The method of claim 1, further comprising:

generating a performance curve for each chiller, each performance curve defining the relationship between the thermal transfer rate of the chiller, the parameter related to the power consumption of the chiller, and the lift of the chiller.

3. The method of claim 2, wherein generating the performance curve comprises:

determining a value of the parameter of the chiller at each of a plurality of thermal transfer rates and lifts of the chiller;

determining a ratio of the value of the parameter and the thermal transfer rate of the chiller at each thermal transfer rate and lift based on the value of the parameter at the thermal transfer rate and lift; and defining the performance curve base on the ratio at each of a plurality of thermal transfer rates and lifts.

4. The method of claim 3, wherein the performance curve is generated for each of a plurality of operating conditions.

5. The method of claim 2, wherein the staging operation is bringing the offline chiller online, and determining the estimated efficiency of the chiller group for the staging operation comprises:

distributing the thermal load between the offline chiller being brought online, and one or more online chillers;

estimating an efficiency of each chiller carrying at least a portion of the thermal load based on the performance curve of the respective chiller; and determining a weighted average of the estimated efficiency of each chiller to generate the estimated efficiency of the chiller group.

6. The method of claim 2, wherein the staging operation is taking the online chiller offline, and determining the estimated efficiency of the chiller group for the staging operation comprises:

distributing the thermal load carried by the chiller being taken offline between one or more remaining online chillers;

estimating an efficiency of each of the one or more remaining online chillers based on the performance curve of the respective chiller; and determining a weighted average of the estimated efficiencies of each of the one or more remaining online chillers to generate the estimated efficiency of the chiller group.

7. The method of claim 2, wherein the staging operation includes both bringing the offline chiller online and taking the online chiller offline, and determining the estimated efficiency of the chiller group for the staging operation comprises:

distributing the thermal load from the chiller being taken offline to the chiller being brought online;

estimating an efficiency of each remaining online chiller and the chiller being brought online based on the performance curve of the respective chiller; and determining a weighted average of the estimated efficiencies of the chillers to generate the estimated efficiency of the chiller group.

8. The method of claim 2, further comprising:

monitoring one or more operating conditions of each chiller; and storing the one or more operating conditions in a database, wherein the performance curve is generated based on the one or more operating conditions.

9. A system comprising:

a chiller group including a plurality of chillers having at least one heat recovery chiller;

one or more processors operatively coupled to the plurality of chillers; and a memory coupled to the one or more processors and including program code that, when executed by the one or more processors, causes the system to:

determine a thermal load on the chiller group, the thermal load including a cooling load and a heating load;

determine a current efficiency of the chiller group;

determine an estimated efficiency of the chiller group after executing a staging operation including one of bringing an offline chiller online, taking an online chiller offline, or both bringing the offline chiller online and taking the online chiller offline, the estimated efficiency, and a lift of the chiller;

determine an emissions caused by the chiller group based on the estimated efficiency thereof and by one or more boilers needed to satisfy the heating load; and stage the chiller group according to the staging operation by selectively activating the at least one heat recovery chiller to minimize the emissions based on emissions weighting of each energy source available to satisfy the heating load and the cooling load by calling for the most efficient quantity and order of heat recovery chillers suitable to meet both the cooling load and the heating load taking into account any contribution to the emissions by the one or more boilers and by causing the chiller group to one of bring the offline chiller online, take the online chiller offline, or both bring the offline chiller online and take the online chiller offline.

10. The system of claim 9, wherein the program code further causes the system to:

generate a performance curve for each chiller, each performance curve defining the relationship between the thermal transfer rate of the chiller, the parameter related to the power consumption of the chiller, and the lift of the chiller.

11. The system of claim 10, wherein the program code further causes the system to generate the performance curve by:

determining a value of the parameter of the chiller at each of a plurality of thermal transfer rates and lifts of the chiller;

determining a ratio of the value of the parameter and the thermal transfer rate of the chiller at each thermal transfer rate and lift based on the value of the parameter at the thermal transfer rate and lift; and defining the performance curve base on the ratio at each of a plurality of thermal transfer rates and lifts.

12. The system of claim 10, wherein the staging operation is bringing the offline chiller online, and the program code causes the system to determine the estimated efficiency of the chiller group for the staging operation by:

distributing the thermal load between the offline chiller being brought online, and one or more online chillers;

estimating an efficiency of each chiller carrying at least a portion of the thermal load based on the performance curve of the respective chiller; and determining a weighted average of the estimated efficiency of each chiller to generate the estimated efficiency of the chiller group.

13. The system of claim 10, wherein the staging operation is taking the online chiller offline, and the program code causes the system to determine the estimated efficiency of the chiller group for the staging operation by:

distributing the thermal load carried by the chiller being taken offline between one or more remaining online chillers;

estimating an efficiency of each of the one or more remaining online chillers based on the performance curve of the respective chiller; and determining a weighted average of the estimated efficiencies of each of the one or more remaining online chillers to generate the estimated efficiency of the chiller group.

14. The system of claim 10, wherein the staging operation includes both bringing the offline chiller online and taking the online chiller offline, and the program code causes the system to determine the estimated efficiency of the chiller group for the staging operation by:

distributing the thermal load from the chiller being taken offline to the chiller being brought online;

estimating an efficiency of each remaining online chiller and the chiller being brought online based on the performance curve of the respective chiller; and determining a weighted average of the estimated efficiencies of the chillers to generate the estimated efficiency of the chiller group.

15. The system of claim 10, wherein the program code further causes the system to:

monitor one or more operating conditions of each chiller; and store the one or more operating conditions in a database, wherein the performance curve is generated based on the one or more operating conditions.

16. A computer program product comprising:

a non-transitory computer-readable storage medium; and program code stored on the non-transitory computer-readable storage medium that, when executed by one or more processors, causes the one or more processors to:

determine a thermal load on a chiller group including a plurality of chillers having at least one heat recovery chiller;

determine a current efficiency of the chiller group;

determine an estimated efficiency of the chiller group after executing a staging operation including one of bringing an offline chiller online, taking an online chiller offline, or both bringing the offline chiller online and taking the online chiller offline, the estimated efficiency being determined based on a relationship between a thermal transfer rate of each chiller, a parameter related to a power consumption of each chiller, and a lift of each chiller;

determine an emissions caused by the chiller group based on the estimated efficiency thereof and by one or more boilers needed to satisfy the heating load; and stage the chiller group according to the staging operation by selectively activating the at least one heat recovery chiller to minimize the emissions based on emissions weighting of each energy source available to satisfy the heating load and the cooling load by calling for the most efficient quantity and order of heat recovery chillers suitable to meet both the cooling load and the heating load taking into account any contribution to the emissions by the one or more boilers and by causing the chiller group to one of bring the offline chiller online, take the online chiller offline, or both bring the offline chiller online and take the online chiller offline.

* * * * *